G. A. LUTZ.
SUPPORT FOR ARTICLES TO BE ELECTROPLATED.
APPLICATION FILED FEB. 2, 1911.
1,022,794.
Patented Apr. 9, 1912.
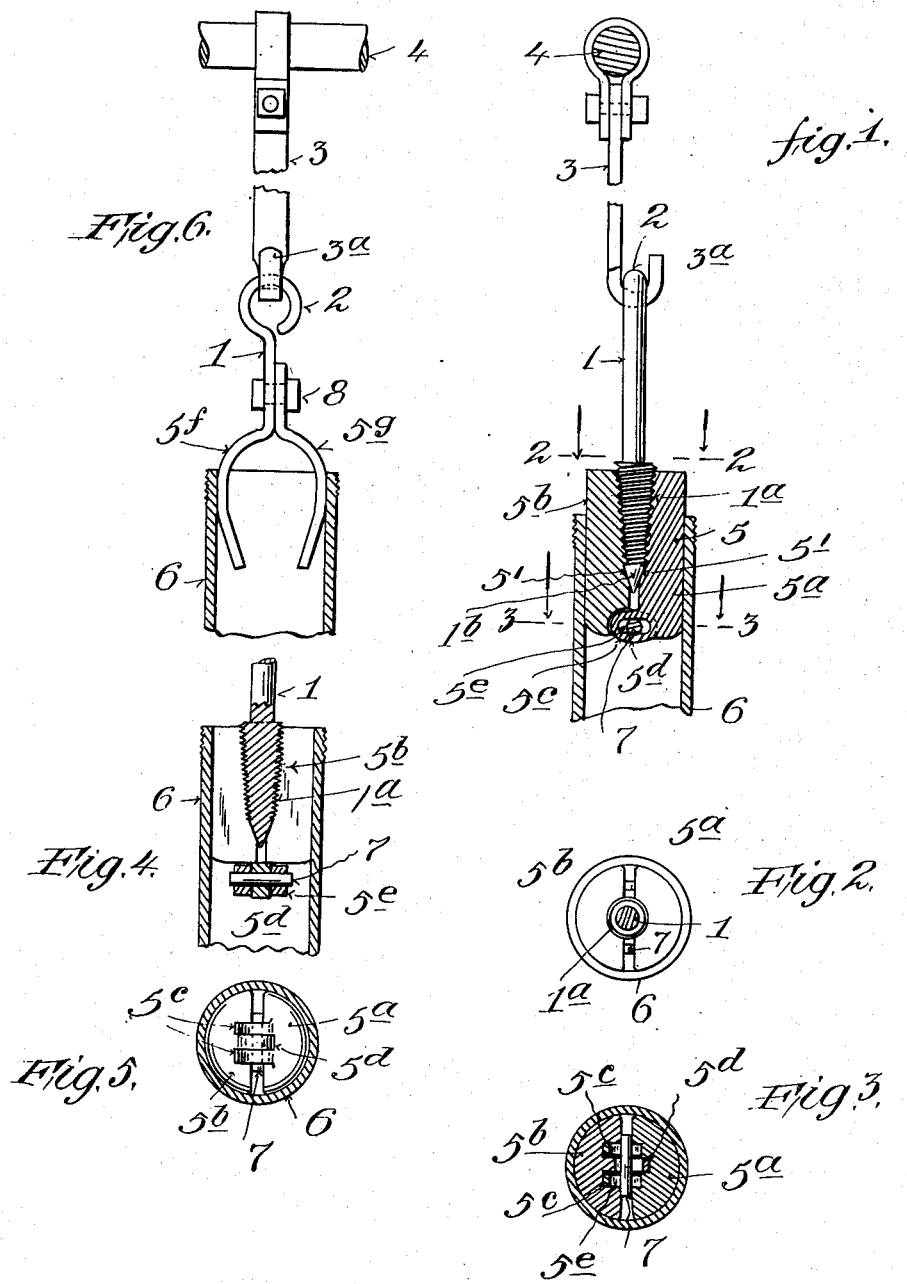

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

SUPPORT FOR ARTICLES TO BE ELECTROPLATED.

1,022,794.      Specification of Letters Patent.      Patented Apr. 9, 1912.

Application filed February 2, 1911. Serial No. 606,082.

*To all whom it may concern:*

Be it known that I, GEORGE A. LUTZ, a citizen of the United States, and resident of Plainfield, in the county of Union and State of New Jersey, have invented certain new and useful Improvements in Supports for Articles to be Electroplated, of which the following is a specification.

Where hollow articles, such as pipes or conduits for conductors in electric systems of distribution, are to be electroplated externally, it is desirable to electroplate the entire length thereof, including threads that are cut on the pipes or conduits near their ends, but where such threads are screwed into supporting sockets a portion at least of the threads will not be electroplated.

The object of my invention is to provide simple and convenient means for supporting pipes, conduits and the like in an electroplating tank by means entering such articles and held in engagement therewith by outward pressure, thereby leaving the entire exterior of such articles exposed to the electrolyte and electric current.

In carrying out my invention I provide a support with an expansible member adapted to fit within a hollow article to be plated, said member when expanded within such article gripping the latter in such manner as to support it.

My invention comprises novel details of improvement and combinations of parts that will be more fully hereinafter set forth and then pointed out in the claims.

Reference is to be had to the accompanying drawings forming part hereof, wherein, Figure 1 is a partly sectional elevation illustrating my improvements; Fig. 2 is a section on the line 2, 2, in Fig. 1; Fig. 3 is a section on the line 3, 3, in Fig. 1; Fig. 4 is a detail section at right angles to Fig. 1; Fig. 5 is an underside view of Fig. 4, and Fig. 6 is a partly sectional view illustrating a modification.

Similar numerals of reference indicate corresponding parts in the several views.

The support 1 is shown provided with an eye or hook 2 adapted for connection with any suitable hanger 3, the latter being shown provided with a hook or eye $3^a$, and adapted to be suspended from a rod or other part 4 of the cathode of an electroplating apparatus. In Figs. 1 to 5, support 1 is shown provided at its lower part with threads $1^a$ fitting threads within the bore of an expansible supporting member 5 to expand the latter into engagement with the hollow article or pipe 6 in which expansible member 5 is adapted to fit. Member 5 is shown comprising two parts $5^a$, $5^b$ pivotally connected together at their lower parts so as to have outward expanding movement. I have shown parts 5, $5^b$ provided with hinge members $5^c$, $5^d$ having elongated laterally disposed slots $5^e$ receiving pin or pintle 7. The threads on the parts $1^a$, $5^a$, and $5^b$ are shown tapering and part 1 is shown tapering and unthreaded at $1^b$ to engage the tapering unthreaded parts $5'$ of member 5 above its hinge. When the device is to be used the expansible member 5 is inserted in article 6, and support 1 is screwed in the member 5, thereby by reason of the tapering of the parts causing the members $5^a$, $5^b$ to expand into firm contact with the hollow article 6, whereby the latter may be hung in an electroplating tank with its entire exterior surface exposed to the electrolyte. To remove the support from article 6 it is merely necessary to unscrew the support 1 to release the expansible member 5.

In Fig. 6 the expansible member is shown in the form of outwardly expanding jaws $5^f$, $5^g$, adapted to fit within article or pipe 6. In the arrangement shown, the parts 1 and $5^f$ are in a single piece and the part $5^g$ is secured thereto by bolt or rivet 8. The parts $5^f$, $5^g$ have a normal outward spring tendency and their lower ends are inclined inwardly so that they may be pushed into pipe 6 and wedged therein by the resiliency of the parts for supporting pipe 6 with its outer surface fully exposed. The pipe 6 may be readily pulled away from the support 1. In either case the support for pipe or article 6 will form part of the circuit from the cathode 4 to the pipe or article 6. By having the parts 1, 3, movably connected together the article 6 to be plated will hang in a vertical position due to movement of the parts 2 and $3^a$ with respect to each other.

The device is simple and cheap to manufacture, efficient in operation, and enables the ready application of the same to and its removal from pipe or article 6.

Having now described my invention what I claim is:—

1. A cathode support for an article to be plated comprising a support provided with threads at its lower part, a pair of relatively movable members having a threaded bore receiving the first named threads, the meeting parts of said members being tapered to cause their expansion, the lower part of said members being pivotally connected together to permit their expansion in parallel relation to interiorly grip the inner wall of the article.

2. A cathode support for an article to be plated comprising a support provided with threads at its lower part, a pair of relatively movable members having a threaded bore receiving the first named threads, the meeting parts of said members being tapered to cause their expansion, the lower parts of said members being provided with hinge members having laterally elongated slots and a pintle passing through said slots to permit lateral parallel movement of said parts.

3. The combination of a cathode provided with a hanger, with a support movably and detachably carried by said hanger and provided at its lower part with expansible members to fit within the bore of an article to be plated to suspend the latter and expose its exterior surface.

Signed at New York city, in the county of New York, and State of New York, this 1st day of February, A. D. 1911.

GEORGE A. LUTZ.

Witnesses:
MAX M. KOTZEN,
T. F. BOURNE.